United States Patent [19]
Lowenstein

[11] Patent Number: 5,351,497
[45] Date of Patent: Oct. 4, 1994

[54] LOW-FLOW INTERNALLY-COOLED LIQUID-DESICCANT ABSORBER

[75] Inventor: Andrew I. Lowenstein, Princeton, N.J.

[73] Assignee: Gas Research Institute, Chicago, Ill.

[21] Appl. No.: 992,855

[22] Filed: Dec. 17, 1992

[51] Int. Cl.$^5$ .............................................. F25D 17/08
[52] U.S. Cl. .......................................... 62/94; 62/271
[58] Field of Search .................................... 62/94, 271

[56] References Cited

U.S. PATENT DOCUMENTS

| | | | |
|---|---|---|---|
| 2,122,012 | 6/1938 | Smith | 62/271 |
| 2,273,108 | 2/1942 | Hibberd | 62/271 |
| 4,939,906 | 7/1990 | Spatz et al. | 62/94 |
| 5,020,333 | 6/1991 | Assaf et al. | 62/271 |
| 5,040,375 | 8/1991 | Von Dobeln | 62/94 |
| 5,050,391 | 9/1991 | Tsimerman | 62/94 |

OTHER PUBLICATIONS

"The Effect of Absorber Design on the Performance of a Liquid-Desiccant Air Conditioner" –A. I. Lowenstein.

Primary Examiner—William E. Tapolcai
Attorney, Agent, or Firm—Amster, Rothstein & Ebenstein

[57] ABSTRACT

An air-conditioning process uses an internally-cooled, liquid-desiccant absorber through which the air to be conditioned, the coolant and the liquid desiccant are passed. The desiccant is passed into the absorber at a flooding rate not exceeding 1.0 gpm/ft$^2$. Preferably cooling water (as coolant) is passed into the absorber at a flooding rate not exceeding 1.0 gpm/ft$^2$ and, in that case, cooling air is passed through the absorber in intimate contact with the cooling water to promote evaporative cooling of the cooling water.

10 Claims, 2 Drawing Sheets

LOW-FLOW INTERNALLY-COOLED LIQUID-DESICCANT ABSORBER

BACKGROUND OF THE INVENTION

The present invention relates to an internally-cooled desiccant absorber for use in a liquid-desiccant air conditioner and, more particularly, such an air conditioner having a high thermal coefficient of performance (COP).

The primary function of the absorber in a liquid-desiccant air conditioner is to dehumidify the supply air to the building. This is done most simply in a packed-bed absorber, which consists of a porous bed of contact medium that is flooded with desiccant. As the desiccant flows down through the bed, it comes in contact with the water-containing process air that can be flowing either down, up, or across the bed. The desiccant—which, by definition, has a strong affinity for water vapor—absorbs moisture from the process air.

During dehumidification, heat is released as the water vapor condenses and mixes with the desiccant. This heat will equal the latent heat of condensation for water plus the chemical heat of mixing between the desiccant and water. At desiccant concentrations typical of a liquid-desiccant air conditioner, the chemical heat of mixing will be about an order of magnitude smaller than the latent heat of condensation.

For the simple packed-bed absorber just described, the heat released during dehumidification will raise the temperature of the air and desiccant as they flow through the absorber. If the desiccant that flows off the bottom of the bed is not cooled before it is recirculated to the top spray nozzles, the air will leave the absorber at close to the same enthalpy as it entered. For example, air enters the absorber at 80° F. [27° C.], 50% R.H. (31.3 BTU/lb enthalpy) and leaves at 97° F. [36° C.], 20% R.H. (31.5 BTU/lb enthalpy). In this configuration, the absorber is a dehumidifier.

The preceding dehumidifier may be incorporated into an air-cooling system by cooling the desiccant before it is sprayed onto the absorber. This can be done by cooling the desiccant with externally chilled cooling water or other refrigerant in a heat exchanger. If the desiccant is cooled before it is sprayed onto the absorber bed, the air will leave the absorber at a lower enthalpy than it entered, i.e.., net cooling. An indirect evaporative cooler can further cool the process air without increasing its absolute humidity.

The preceding cooling/dehumidifying system can be made more compact by integrating the desiccant cooler into the absorber bed to provide an internally cooled absorber for a liquid-desiccant air conditioner. This internal desiccant cooler will most commonly be configured as a heat exchanger with liquid desiccant and process air flowing through one set of channels and a coolant flowing through the other set of channels. The coolant can be (a) chilled water, (b) a chilled refrigerant such as a water/glycol mixture, or (c) a boiling refrigerant, such as R12 or R22, or their HFC and HCFC replacements, that is supplied from a mechanical refrigeration system. The coolant can also be a film of flowing water in contact with an air flow that evaporatively cools the water. One embodiment of this last approach to an internally cooled absorber is the "three way" absorber described by Lowenstein, A., J. Marsala, M. Spatz, S. Feldman, and J. Tandler (1988) "Integrated gas-fired desiccant dehumidification vapor compression cooling system for residential application," Phase I Final Report, GRI-88/0326. This report available from the National Technical Information Service as Report No. PB89140842 at a nominal cost. In this report, the nominal operating conditions of the absorber are presented as 500 cfm for the process side and 750 cfm for the cooling side (page 72, first full paragraph). The absorber is described (page 69, third full paragraph) as being composed of two air-to-air heat exchangers that are each 30 cm×30 cm×60 cm. FIG. 4.21 (page 68) shows how the two heat exchangers are stacked within the absorber's cabinet. The discussion (page 69, first two full paragraphs) explains that the process air flows upward and the cooling air flows crosswise. In this configuration, the face area for the process flow is 30 cm×60 cm, and for the cooling flow, 60 cm×60 cm. Since only half the face area is available for air flow, the actual flow areas are 0.97 ft$^2$ and 1.94 ft$^2$ for the process and cooling air, respectively. The air velocities are, therefore, calculated to be about 500 fpm and 400 fpm for the process end cooling air. These values are the lower limits of the gas flow rates.

In the "three-way" absorbers, the internally-cooled absorber is constructed as a cross-flow parallel-plate heat exchanger. Process air flows through one set of passageways and cooling air through the other. On the process side, desiccant is sprayed onto the plates; on the cooling side, water is sprayed onto the plates. As the process air is dried in the "three-way" absorber, the heat that is released is immediately transferred to the cooling air. Since the cooling air is maintained at close to its wet-bulb temperature, the temperature rise for the desiccant as it flows through the absorber is very low. This increases the dehumidification capacity of the absorber.

An internally-cooled absorber is more difficult to fabricate than an absorber that separates the dehumidification and cooling processes—i.e., an absorber that uses simple contact media, coupled with either an air cooler or desiccant cooler. The most significant problem will be leakage between the desiccant and cooling water. However, the performance benefits provided by this absorber typically justify its use.

The relative flow rates of air and desiccant will have an important effect on the dehumidification performance of the absorber.

Accordingly, it is an object of the present invention to provide an air conditioning process wherein the internally-cooled absorber is operated at the optimum flow rates of liquid desiccant and cooling water in order to maximize the coefficient of performance (COP) of the air conditioner.

SUMMARY OF THE INVENTION

It has now been found that the above and related objects of the present invention are obtained in an air-conditioning process using an internally-cooled, liquid-desiccant absorber through which the air to be conditioned, the cool ant and the liquid desiccant are passed. The process comprises the step of passing the desiccant into the absorber at a flooding rate not exceeding 1.0 gpm/ft$^2$ (gallons per minute per cross-sectional area of the channels through which the desiccant and process air flows). Preferably cooling water (as the coolant) is passed into the absorber at a flooding rate not exceeding 1.0 gpm/ft$^2$ and, in that case, cooling air is passed through the absorber in intimate contact with the cooling water to promote evaporative cooling of the cooling water.

In a preferred embodiment, the desiccant flooding rate is 0.1–0.3 gpm/ft$^2$, and at least 0.03 gpm/ft$^2$, and the cooling water flooding rate is 0.1–0.3 gpm/ft$^2$, and at least 0.03 gpm/ft$^2$.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
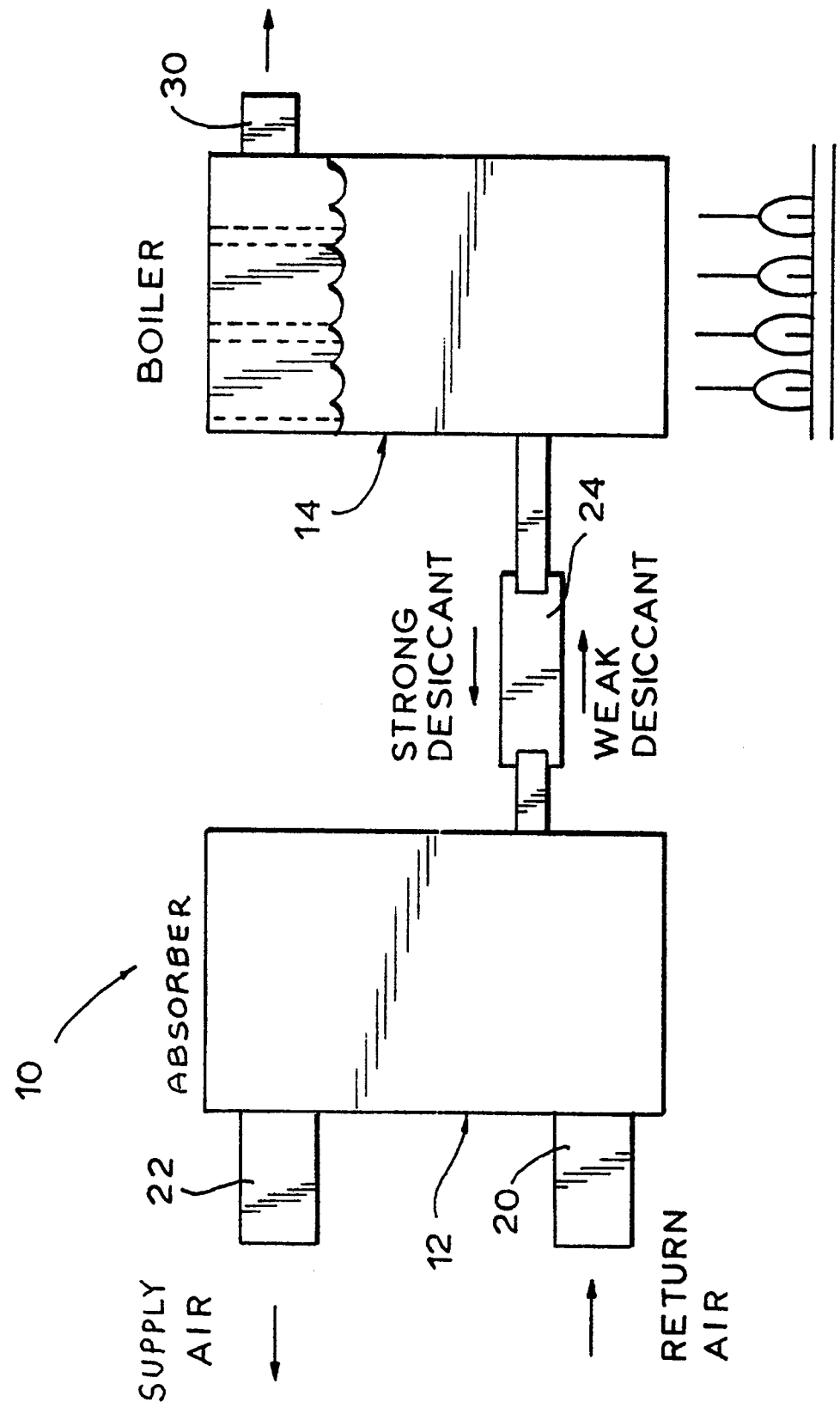
FIG. 1 is a schematic view of a liquid-desiccant air conditioner with a regenerator according to the present invention.

Referring now to the drawing, and in particular to FIG. 1 thereof, therein illustrated schematically is a liquid-desiccant air conditioner according to the present invention, generally designated by the reference numeral 10, comprising an absorber generally designated 12 and a regenerator generally designated 14 (illustrated as a gas-fed burner boiler). Process air (for example, from a building) is fed into the absorber 12 at return air duct 20 and leaves the absorber 12 through a supply air duct 22 after dehumidification (for example, for return to the building). The cool weak desiccant discharged by the absorber 12 passes through a heat interchanger 24 where it is preheated by the hot strong desiccant discharged by the regenerator 14. The preheated weak desiccant is regenerated in the regenerator 14 (e.g., a boiler) with strong desiccant being returned to the desiccant sprayer 26 (see FIG. 2) of absorber 12 (via interchanger 24) and liquid water or water vapor being discharged or recycled through outlet duct 30.

Figure 2:
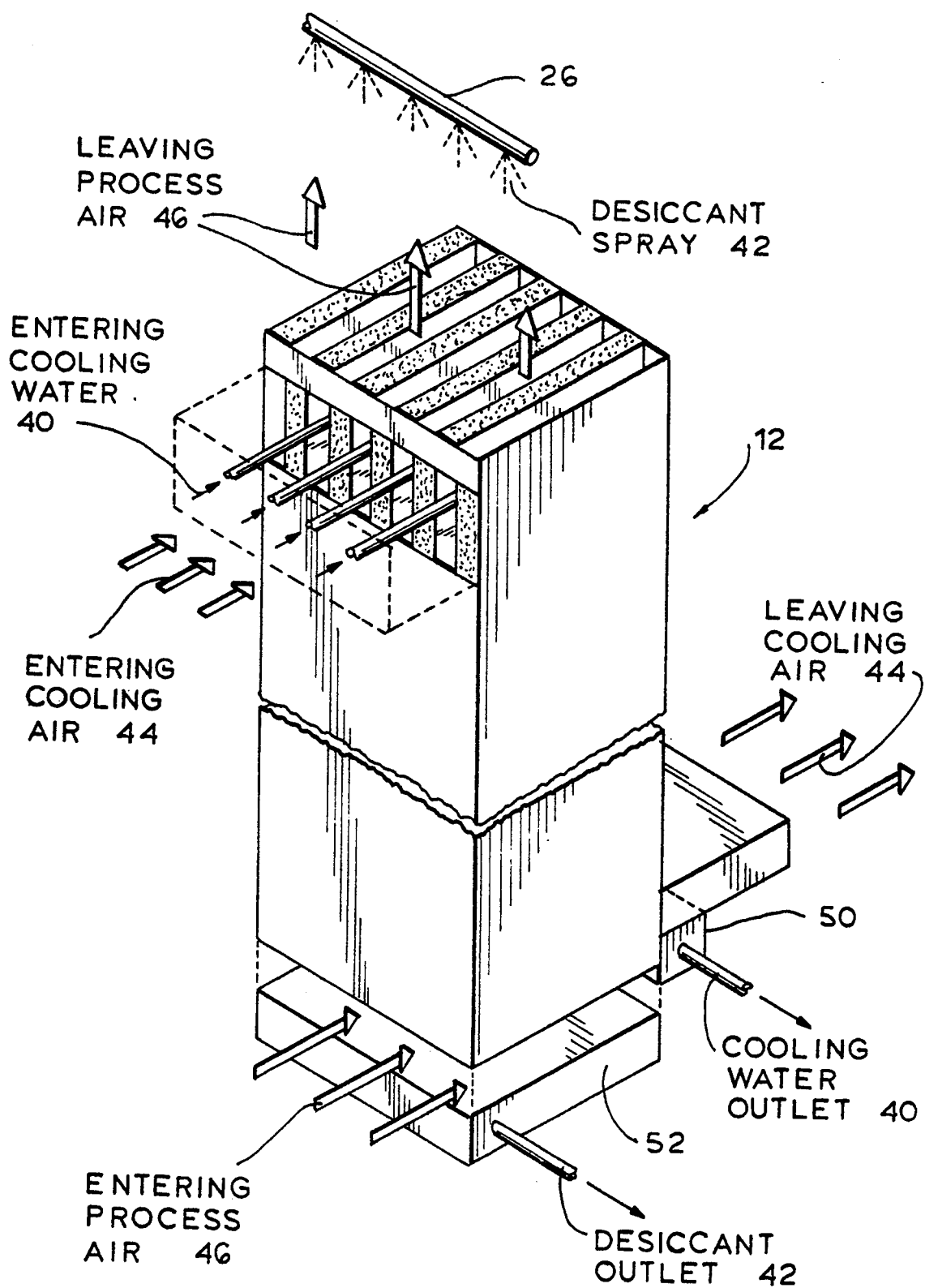
FIG. 2 is a schematic view of the absorber thereof according to the present invention.

Referring now to FIG. 2, therein illustrated schematically in greater detail is the counterflow absorber 12. A cooling water spray 40 (as coolant), a strong desiccant spray 42, and cooling air 44 are passed downwardly while the process air 46 is passed upwardly. The water spray 40 is optionally collected in a water reservoir 50 for subsequent recalculation, and the weak desiccant spray 42 is optionally collected in a desiccant reservoir 52 for subsequent return to the boiler regenerator 14 (via the interchanger 24).

While the description herein of the internally-cooled absorber is based primarily on a model using evaporative cooling within the absorber (that is, a stream of cooling air flowing over the film of cooling water within the absorber), it is also possible to have an internally cooled absorber that does not utilize evaporative cooling within the absorber. Thus, cooling water or another refrigerant may be chilled before it enters the absorber, the chilled coolant flowing through tubes within the absorber or between plates of a plate-type heat exchanger (without any cooling air flow within the absorber in either case). Alternatively, chilled coolant could be replaced with boiling refrigerant, such as R12, R22, or one of their HFC or HCFC replacements, that is delivered from a mechanical refrigeration system. Thus, it will be appreciated that the benefits arising from the use of low desiccant flow rates, as described hereinbelow, apply to all internally cooled absorbers, whether with or without internal evaporative cooling.

The performance of such a liquid-desiccant air conditioner system is studied herein at ARI indoor conditions with an internally-evaporatively-cooled absorber using mathematical models. Furthermore, flow rates for desiccants first, and then for cooling water, are varied over a wide range to determine their effect on system COP. Counterflow and cross-flow configurations are then compared. Heat transfer coefficients are calculated from an empirical expression that applies to channels bounded by flat plates with no liquid-gas interactions (i.e., waviness on the surface of the liquid films). The Lewis number is assumed to be equal to one.

All absorbers are studied as part of the complete liquid-desiccant air conditioner characterized by lithium chloride (LiCl, a liquid desiccant) at a spray concentration that provides, in most cases, cooling at 400 cfm/ton (53.6L/(s·kW)), a single-effect boiler that operates subatmospherically to produce a 120° F. steam saturation temperature (Lowenstein, A., and M.H. Dean (1992) "The effect of regenerator performance on a liquid-desiccant air conditioner," ASHRAE Transactions 98(1)), a 67% effective interchanger, an 80% gas utilization efficiency in the boiler, absorber composed of flat plates spaced 0.157 in. (4.0 mm) apart, height and width 3 ft (0.91 m), velocity of the process and cooling air is 800 fpm (4.1 m/s), cooling water flow rate is 7.0 gpm/ft$^2$ (4.75L/(s·m$^2$)) unless otherwise stated, and operation processing inlet air at ARI indoor conditions (80° F. [27° C.], 50% RH).

In a liquid-desiccant air conditioner using an adiabatic absorber, heat is rejected to ambient in either a desiccant cooler, an air cooler, or both. These coolers will be major components that will have cost, size, and electrical power requirements that are comparable to the absorber. A more compact alternative is to design the absorber so that dehumidification and heat rejection occur simultaneously in a single component. As already noted, this is the approach that has been taken in an internally-cooled absorber.

In an adiabatic absorber, the flow rate of desiccant must be sufficiently high to prevent appreciable temperature rises in the desiccant due to the heat released in the drying process. In a typical adiabatic absorber one-half to two gallons per minute of desiccant are flowed per 100 cfm of gas. However, an internally-cooled absorber differs from an adiabatic unit in that, since the desiccant is continually cooled, the desiccant flooding rate no longer must be sufficient to prevent a significant temperature rise in the desiccant as it flows down through the bed. Thus the internally-cooled absorber will have a good dehumidification effectiveness at L/G (liquid/gas) ratios that are more than an order of magnitude less than that for the adiabatic unit.

Nonetheless in conventional internally-cooled absorbers, desiccant flow rates are of the same order of magnitude as in the comparable adiabatic absorbers, even though there is no longer the requirement to prevent a temperature rise in the desiccant (since the desiccant is cooled as it flows through the absorber). It is theorized that conventional desiccant flow rates are kept high partly as a carryover from the experience on adiabatic absorbers, and partly to maintain good wetting of the contact surface. Indeed, in current practice, the flow rates are so high that the concentration of desiccant will change very little as it flows through the absorber. Thus, the concentration of the weak desiccant that is sent to the regenerator is approximately the same as the concentration that is sprayed into the absorber.

In a practical desiccant system, there is a requirement to keep both (1) the desiccant spray concentration in the absorber high, so that the process air can be adequately dried, and (2) the desiccant concentration in the regenerator low, so that the regenerator operates at a lower temperature and the regeneration process is more efficient. Since the desiccant concentration in the regenerator must be higher than in the absorber, this requirement tends to minimize the concentration difference between the absorber and the regenerator.

However, the exchange flow of desiccant between the regenerator and the absorber will be approximately inversely proportional to the difference between the absorber and regenerator concentrations. Since large exchange flows penalize the efficiency of the system, a practical lower limit is placed on difference between the absorber and regenerator concentrations.

A typical difference between the absorber and regenerator concentrations in a LiCl liquid-desiccant system would be 4 percentage points. At this value, the energy required to heat the weak desiccant from its temperature in the absorber to the operating temperature of the regenerator will be approximately the same as the energy required to remove water vapor from the desiccant in the regenerator. Since a heat exchanger is used to transfer energy from the hot, strong desiccant leaving the regenerator to the weak desiccant, this energy for preheating, which must be provided from an outside source, is reduced. For a 67% effective heat exchanger, the additional energy that is needed to preheat the weak desiccant will degrade the system's COP by about 20%.

More particularly, at all desiccant flooding rates above 0.1 gpm/ft$^2$ (0.068 L/(s·m$^2$)) the COP of a hypothetical liquid-desiccant air conditioner increases as the concentration differential between the absorber spray and boiler increases. This increase is caused by the lower exchange rate of desiccant between the absorber and boiler that is needed to meet the water load on the system.

At a concentration differential of 4 percentage points and a desiccant flooding rate of 5 gpm/ft$^2$ (3.4 L/(s·m$^2$)), approximately 2% of the absorber flow must be diverted to the boiler for regeneration. This weak stream must be heated from 80° F. (27° C.) to approximately 180° F. (82° C.). Although the interchanger provides much of this preheating requirement, a 67% interchanger leaves a preheating load that is 20% of the total thermal requirements for regeneration—i.e., a 20% reduction in the system's COP. This preheating requirement will decrease at higher concentration differentials because less desiccant must be exchanged between the boiler and absorber to meet a given water load.

Although this improvement in COP would continue beyond the mentioned 4 percentage concentration differential, the desiccant's concentration in the boiler becomes unacceptably high. A concentration limit is roughly set by the need to avoid crystallization at the lowest temperature reached by the strong desiccant as it returns to the absorber. At a 6 percentage point differential, the concentration in the boiler is more than 44%, which corresponds to a saturated salt solution at about 70° F. (21° C.). Designing the regenerator to operate at this concentration would leave little safety margin to avoid crystallization.

LOW DESICCANT FLOW RATE

A second approach to decreasing the penalty imposed by preheating the weak desiccant is to operate the absorber so that a very weak stream of desiccant is produced and there is appreciable dilution of the desiccant as it flows through the absorber.

There is a steady increase in COP as the desiccant flooding rate decreases from 5.0 to 0.05 gpm/ft$^2$ (3.4 to 0.034 L/(s·m$^2$)). At 0.05 gpm/ft$^2$ (0.034 L/(s·m$^2$)), the desiccant weakens by between 7 and 8 percentage points as it flows down the bed (compared to less than 0.1 percentage point for a 5.0 gpm/ft$^2$ (3.4 L/(s·m$^2$)) flooding rate). At the 0.05 gpm/ft$^2$ (0.034 L/(s·m$^2$)) desiccant flooding rate, the air conditioner's COP is approximately 0.70 for all concentration differentials. This is a 26% improvement over the more typical operating condition of 5.0 gpm/ft$^2$ (3.4 L/(s·m$^2$)) and 4 percentage point concentration differential. Since the flow to the regenerator is drawn from this very weak desiccant, its flow rate, and hence preheating requirements, will be very low. This accounts for the high system COP at low flooding rates.

Dilution that significantly degrades the performance of the system will occur at a desiccant flooding rate of about 0.03 gpm/ft$^2$ (0.02 L/(s·m$^2$)). One would expect that at desiccant flooding rates below 0.03 gpm/ft$^2$ (0.02 L/(s·m$^2$)), the COP would decrease as the absorber's latent effectiveness is degraded by the dilution of the desiccant.

The operation of the absorber at very low desiccant flooding rates can improve the performance of the liquid-desiccant air conditioner in other ways. It should be possible to stage the regeneration process, partially regenerating the very weak desiccant in a first stage that operates at a lower temperature, and then completing the regeneration in a second high-temperature stage. This approach could improve the efficiency of regeneration by between 5% and 15% depending on whether a simple boiler, a multiple-effect boiler, or a vapor-compression distillation regenerator is used.

The operation of the absorber at desiccant flooding rates as low as 0.05 gpm/ft$^2$ (0.34 L/(s·m$^2$)) requires the use of methods for both distributing the desiccant over the top of the bed and completely wetting the surface of the contact media. For example, a wicking material may be applied to the contact surface in the absorber to distribute the low flow evenly over the surface.

LOW DESICCANT AND WATER FLOW RATES

When the above-mentioned low desiccant flow rates are used within an internally-evaporatively-cooled absorber, the air conditioner system COP is improved even further by the use of low water flow rates within the absorber as well. This involves the passing of cooling air through the absorber in intimate contact with the cooling water to promote evaporative cooling of the cooling water, thereby to maintain it at a more-or-less constant temperature. Chilling of the cooling water before it enters the absorber does not provide sufficient internal cooling of the absorber in view of the low cooling water flow rate.

At very low flow rates of cooling water, scale may accumulate on heat transfer surfaces of the absorber. This phenomenon will depend on the water quality as well as flow rate. If very pure water is available—such as condensate from the desiccant regenerator—scaling will not occur.

Consider absorber operation for high and low cooling water flow rates (7.0 gpm/ft$^2$ [4.75 L/(s·m$^2$)] vs. 0.3 gpm/ft$^2$ [0.2 L/(s·m$^2$)]), the cooling water flowing through a separate set of channels than the desiccant and process air. For both flow rates, the process air flows downward and the desiccant flow is 0.3 gpm/ft$^2$ (0.2 L/(s·m$^2$)). (The lowest possible cooling water flow rate for the mentioned operating conditions will be about 0.1 gpm/ft$^2$ (0.068 L/(s·m$^2$)). At this value almost all the water evaporates before reaching the end of the absorber. If the need to avoid scaling imposes a requirement that no more than 10% of the cooling water evaporates, the limit on water flow rates would be about 1.0 gpm/ft$^2$ (0.68 L/(s·m$^2$)).)

For the high water flow rate, the COP of the liquid-desiccant air conditioner will be 0.63. For the low water flow rate, the COP will be 0.75. This is almost a 20% improvement in efficiency.

As noted earlier in regard to very low desiccant flow rates, the use of very low cooling water flow rates requires the use of techniques for uniformly distributing the liquid over the internal surfaces of the absorber, but these appear to be warranted by the potential performance improvements that could be achieved if absorbers were designed to operate at these low flow conditions. For example, a wicking material may be applied to the contact surface in the absorber to distribute the flow evenly over the surface.

COUNTERFLOW VS. CROSS-FLOW DESIGN

The internally-cooled absorbers that were mathematically modeled and studied hereinabove were counterflow designs wherein cooling air and process air flowed in different directions through the absorber, with the desiccant and cooling water flowing down. Although this configuration provides the highest latent and sensible effectivenesses, it can lead to an absorber that is difficult to manufacture and an air conditioner that either is too large or has inconvenient requirements regarding the location of cooling and process air ducts. Since a cross-flow absorber can overcome some of these limitations, it is important to know the performance compromises imposed by this design. Accordingly, the internally-evaporatively-cooled absorber was also modeled as a cross-flow unit. In this case, process air, desiccant, and cooling water all flowed down, and cooling air flowed crosswise.

At flooding rates greater than 4.0 gpm/ft$^2$ (2.7 L/(s·m$^2$)), the cross-flow absorber produces slightly higher system COPs than the counterflow absorbers. This occurs because the change to a cross-flow design is degrading dehumidification more than evaporative cooling and, hence, produces a higher sensible heat ratio for the absorber and a higher thermal COP for the air conditioner. At 0.3 gpm/ft$^2$ (0.2 L/(s·m$^2$)), the COP of the cross-flow absorber is about 5% lower than that for a counter-flow absorber operating at the same flow rates.

To summarize, cooling and dehumidification can be achieved in a single device—the internally-evaporatively-cooled or "three-way" absorber; Lowenstein, A., and R.S. Gabruck (1992) "The effect of absorber design on the performance of a liquid-desiccant air conditioner," *ASHRAE Transactions* 98(1). The present invention involves maximizing system COP by reducing the desiccant flow rate or the desiccant/cooling water flow rates in the internally-evaporatively-cooled absorber to values that are much lower than common practice. Values as low as 1% of what are now common may be used. According to the present invention, system COP is maximized by using desiccant and water flooding rates in the absorber which do not exceed 1.0 gpm/ft$^2$, are preferably greater than 0.03 gpm/ft$^2$ and are optimally 0.1–0.3 gpm/ft$^2$. A sufficient quantity of the cooling air is passed through the absorber in intimate contact with the cooling water to promote evaporative cooling.

At the low desiccant flow rate, the concentration of the desiccant will decrease significantly as it flows down through the absorber. For a LiCl absorber dehumidifying the return air from a building, a typical change in desiccant concentration would be 5 to 7 percentage points. If this very weak desiccant is sent to the regenerator, the flow of desiccant to the regenerator could be greatly reduced, while still maintaining a relatively low concentration in the regenerator. This lower flow rate would decrease the energy required for preheating the desiccant up to the regenerator temperature, and, therefore, improve the system's COP.

In a counterflow parallel-plate configuration, this internally-evaporatively-cooled absorber produces a 0.75 system COP if the desiccant and cooling water flooding rates are kept very low (below 0.3 gpm/ft$^2$ [0.2 L/(s·m$^2$)]) and the process air flows concurrent to the desiccant. These conditions increase the sensible heat ratio of the absorber, and so produce a higher thermal COP. Also, the low desiccant flooding rate produces a very weak desiccant stream at the exit of the absorber. This reduces the flow of desiccant to the regenerator needed to meet the water load and, in turn, lowers the system's preheating requirements for the desiccant entering the regenerator.

The long term practicality of operating at very low desiccant and water flooding rates remains to be demonstrated. If high water flooding rates—3.0 gpm/ft$^2$ (2.0 L/(s·m$^2$)) or higher—are used to avoid scaling and achieve uniform coverage, system COPs will degrade by about 15%. An additional 5% loss in COP will occur if high desiccant flooding rates are also used.

Cross-flow configurations for the absorber, which are easier to integrate into a packaged air conditioner, have comparable performance to the counterflow units. The internally-evaporatively-cooled cross-flow absorber will produce a system COP that is comparable to or slightly higher than that of the counterflow absorber at all operating conditions except very low water and desiccant flooding rates. If both the desiccant and water flooding rates are reduced to 0.3 gpm/ft$^2$ (0.2 L/(s·m$^2$)), the COP at ARI conditions for a liquid-desiccant air conditioner using the cross-flow absorber will be only 5% lower than the best counterflow design.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. An air-conditioning process using an internally-cooled, liquid-desiccant absorber through which the air to be conditioned, the coolant and the liquid desiccant are passed, comprising the step of passing the desiccant into the absorber at a flooding rate of 0.03–1.0 gpm/ft while passing the air to be conditioned into the absorber at a flow rate not exceeding 800 fpm.

2. The process of claim 1, additionally including the steps of passing cooling water as the coolant into the absorber at a flooding rate of 0.1–1.0 gpm/ft$^2$, and passing cooling air through the absorber in intimate contact with the cooling water and at a flow rate not exceeding 800 fpm to promote evaporative cooling of the cooling water.

3. The process of claim 2 wherein the air to be conditioned and the cooling water are passed in counterflow.

4. The process of claim 3 wherein the air to be conditioned flows upwardly.

5. The process of claim 2 wherein the air to be conditioned and the cooling water are passed in cross-flow.

6. The process of claim 1 wherein said desiccant flooding rate is 0.1–0.3 gpm/ft$^2$.

7. The process of claim 2 wherein said cooling water flooding rate is 0.1–0.3 gpm/ft$^2$.

8. An air-conditioning process using an internally-cooled, liquid-desiccant absorber through which the air to be conditioned, the cooling water, the cooling air and the liquid desiccant are passed, comprising the step of passing the desiccant into the absorber at a flooding rate of 0.03–1.0 gpm/ft$^2$ while passing the air to be conditioned into the absorber at a flow rate not exceeding 800 fpm, passing the cooling water into the absorber at a flooding rate of 0.1–1.0 gpm/ft$^2$, and passing cooling air through the absorber in intimate contact with the cooling water and at a flow rate not exceeding 800 fpm to promote evaporative cooling of the cooling water.

9. An air-conditioning process using an internally-cooled, liquid-desiccant absorber through which the air to be conditioned, the coolant and the liquid desiccant are passed, comprising the step of passing the desiccant and the air to be conditioned into the absorber at a liquid-to-gas mass flow ratio (liquid desiccant-to-air to be conditioned) of about 0.005–0.17.

10. The process of claim 9 wherein cooling water and cooling air are passed into the absorber at a liquid-to-gas mass flow ratio (cooling water-to-cooling air) of about 0.014–0.14.

* * * * *